United States Patent Office 3,152,605
Patented Oct. 13, 1964

3,152,605
CONTROL SYSTEM FOR AN INSTALLATION HAVING VALVES OPERATED BY PRESSURE MEANS
Theodore de Koning, 23 Walnut St., Philadelphia, Pa.
Filed Apr. 20, 1961, Ser. No. 104,406
Claims priority, application Germany Oct. 19, 1960
8 Claims. (Cl. 137—219)

This invention relates to pressure actuated valves and in particular relates to a control system for and an installation including pressure actuated valves.

The term "valves" in this specification is intended to include all kinds of pipe closure devices, that is to say slide valves, adjustable throttles and the like. The pressure actuating means may be liquid or gaseous. The pressure actuating means can be positive or negative, above atmospheric pressure or below.

It is difficult to arrange a plurality of power actuated drives correctly in a common installation, such as an aeroplane, a power press, a gun turret or the like, because the operating conditions at each driving point are generally different. With such an installation, in principle, a uniform actuating pressure is first selected for the entire system and the dimensions of the individual driving pressure chambers are calculated on the basis of this pressure. It is easy to perceive that, in this manner, a plurality of very differently designed driving components must result which necessarily increases the cost of the installation. Furthermore, it may be found during operation that the dimensions of one or more of the pressure chambers are not correct and the corresponding entire driving component must be replaced by another driving component.

The difficulty is even more apparent when a plurality of pressure actuated valves are to be operated. Valves and other pipe line closure devices are generally subject to the pressure of the operating medium flowing therethrough or therepast, and this pressure can be very different at various points in a pipe line system and can, in addition, vary dependently upon the required opening position of the valve. Apart from very simple operating conditions, it is practically impossible to select the surface measurements of the valve pressure chambers so that, with a constant pressure level in the supply of the valve actuating medium, optimum operating ratios are obtained for each operating condition. This is a main reason why pipe line installations having pressure actuated valves have hitherto not been considered practicable, particularly for comparatively large plant and long distance pipe line supply systems.

According to one feature of the present invention a method of controlling a flow stream of an operating medium liable to a changed operating condition, e.g., an increase or decrease in the operating pressure, comprises inserting into the flow stream at least one pressure actuated valve the actuating pressure of which may be selectively adjusted to control the operating condition or to compensate for a change in the operating condition.

According to a further feature of the present invention a control system for an installation having a plurality of pressure actuated valves is provided in which each valve is selectively adjusted with reference to the operating pressure of the medium flowing therethrough or therepast by selective adjustment of the pressure level of the actuating medium fed to the valve.

According to a still further feature of the present invention an installation is provided having a plurality of automatically controlled pressure actuated valves.

This is believed to be a radical departure in the art. Since the actuating pressure can be adjusted as desired, even if necessary after the installation has been completed and when in operation, minimum difficulty is involved in the adjustment of each valve to the appropriate operating conditions peculiar thereto. There is unlikely to be unbalanced arrangement or incorrect adjustment of the pressure chamber. Only a few selected pressure chamber diameters need be used with the present invention, because the necessary opening or closing force of the valve is adjusted individually by means of the actuating pressure supplied thereto. Merely by predetermining two pressure levels for each individual valve, namely, an opening pressure level and a closing pressure level of the operating means, each valve can be accurately and individually adjusted to its prevailing operating conditions.

Since, with the present invention, it is possible to actuate valves whose pressure chamber cross section is laid down independently of the existing operating pressure conditions, it is now possible to standardize the cross section of each pressure chamber, this cross section being determined particularly dependently on the diameter and wall thickness of the connecting pipe. This is an important advantage, because standardization in pipe line construction has already advanced very far, but has hitherto found its limit with pressure actuated valves which had to be individually adapted to the local operating conditions.

Furthermore, with the present invention valves can also be used, the pressure chambers of which lie in the flow or stream of the medium passing through or past the valve. Such valves are very unlikely to break down, because no displaceable parts, or example the valve stem, need to be disposed externally of, i.e. extending through, the valve casing. With these valves, however, the cross section of the pressure chamber can in no way be adapted to the operating conditions unless the outer dimensions of the entire valve housing are simultaneously changed, a feature involving very high constructional alteration costs.

Even if, for each individual valve of the system, two actuating pressure levels (for the opening pressure and for the closing pressure) need to be provided, usually a relatively small number of pressure levels in the entire system is sufficient, because a given pressure level can be arranged to serve both as a closing pressure for a first valve or valve group and also as an opening pressure for a second valve or valve group.

The various pressure levels can be most simply provided by means of a series of pressure vessels in the system of the actuating medium, each individual vessel being associated with a different actuating pressure level. For charging these containers, a series of motor driven pumps may be used, a pressure-dependent regulating device being provided for each vessel, said device keeping the pressure in the vessels between predetermined maximum and minimum limits. Frequently one pump is sufficient for several such vessels having different pressure levels if, between at least two such pressure vessels an automatic or hand-operated pressure-reducing valve is provided for charging the vessel of lower pressure from, for instance, the vessel of higher pressure.

The actuating system of the present invention can be compared in many respects with an electric actuating system, but in contrast thereto, has a large number of additional advantages. It is comparable for example in that remote control can be effected, whilst it is also even possible to commence actuation from different positions in the system, i.e. the valves need not necessarily be actuated in sequence. The invention goes beyond this in that the actuating medium permits any desired intermediate position of the valve to be obtained, a feature which is possible electrically only by means of a much more complicated motor. The arrangement of the present invention makes it possible to indicate the position of the valve immediately by means of the actuating medium itself, for example, because the valve pressure chamber supply line is provided with an indicator, preferably with an indicator scale or cyclometer. In the system of the present invention, the actuating medium can also be used for other functions, for example to influence the temperature of the valve.

It can thus be seen that on the basis of the present invention an installation can be designed wherein, despite extremely different operating conditions, only a relatively small number of valve sizes to be actuated by pressure means is required. The installation can have a large and widely separated number of branches, nevertheless all the control and supervisory members can be combined in one control point and/or several sub-control points. All the actuating control and regulating operations can be effected by means of the actuating system of the present invention.

The invention will be further described by way of example with reference to the accompanying drawings, in which.

Figure 1:
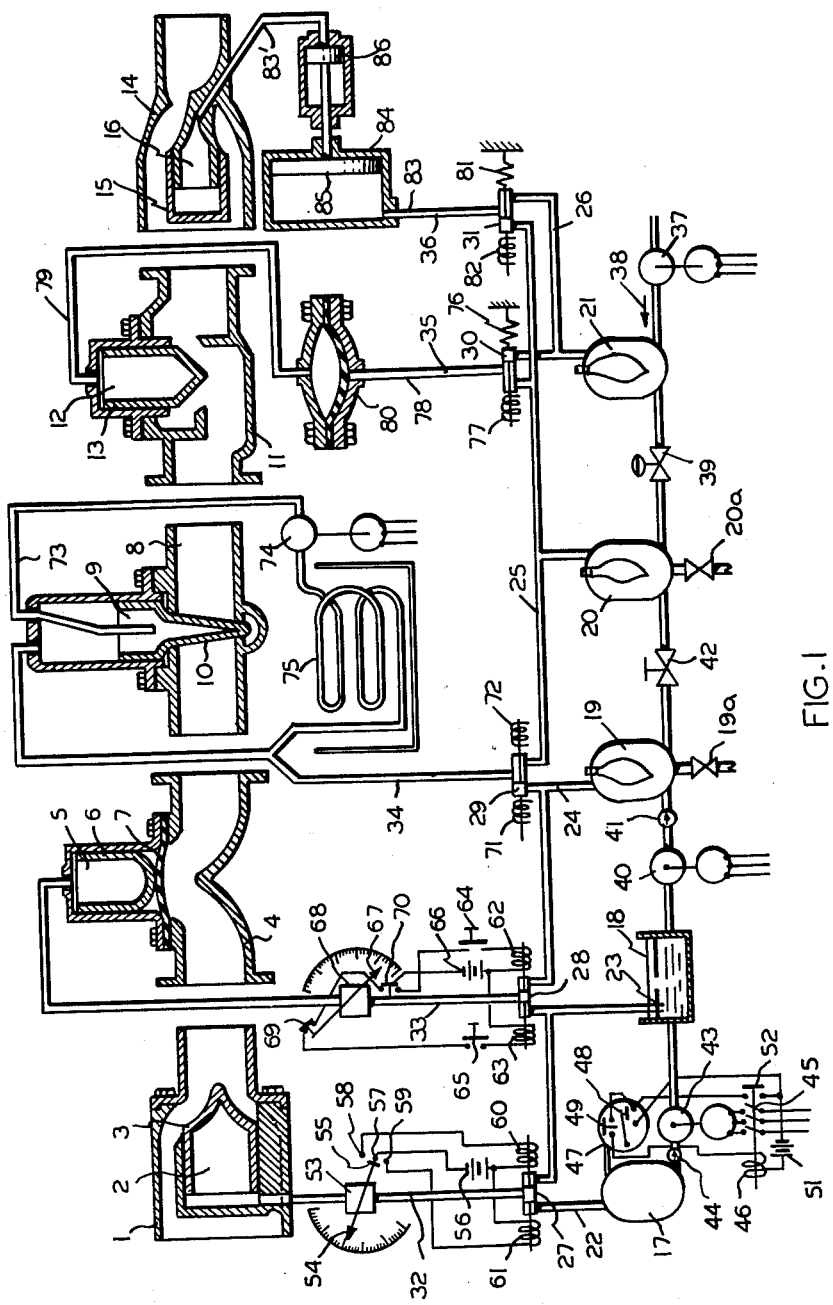
FIG. 1 is a diagrammatic view of a system having valves operated in accordance with the present invention.

FIG. 1 includes five different valves which can be actuated by pressure means and which can be disposed at various places in the same pipe line or in various pipe lines of the same system. Thus a piston valve 1 has a pressure chamber 2 sealed on one side by the inner piston 3 which also effects the sealing function to close the valve. Secondly, a diaphragm valve 4 is provided wherein a piston 6 controlled by a pressure chamber 5 acts on a diaphragm 7 capable of changing the flow cross section. Thirdly, a wedge-shaped slide valve 8 is provided, from a pressure chamber 9 of which a slide member 10 is actuated. With a fourth valve 11 a piston 13 controlled by the pressure chamber 12 is located perpendicularly to the main axis of the valve and also forms a sealing member for the valve. Finally, as a fifth valve 14, a construction is provided having an outer piston 15 externally of a pressure chamber 16.

It must be borne in mind that all the above valves generally require different pressures for their actuation. This applies as much with regard to the three valves 4, 8 and 11 as to the valves 1 and 14, even though the pressure chambers thereof have the same cross section. In the present invention the difference in the actuating pressures required by two different valves or of a given type of valve in different parts of a system is achieved by different pressure levels of the actuating medium supplied thereto.

Five vessels or containers 17 to 21 are available as pressure reservoirs for a liquid actuating pressure medium. The pressure levels in this series of vessels increase from a negative pressure in vessel 17, to atmospheric pressure in the open vessel 18, and to increasingly higher positive pressures in the vessels 19, 20 and 21. The last three vessels may be constructed as Greer or bladder type accumulators. Each vessel has an outlet pipe line or conduit 22 to 26 respectively, one or more of which can, if required, be branched, to an input of one or more of the two-way or reversing valves 27 to 31 and so into the pressure medium supply pipes or conduits 32 to 36 of the appropriate pressure chamber of the five valves which may be required to be actuated.

The charging of the vessel 21 is effected by means of the power pump 37 which feeds the actuating medium from a storage unit (not shown) by way of a non-return valve 38, the pressure of the vessel 21 being kept between predetermined maximum and minimum values.

By way of a reducing valve 39, the actuating medium can be delivered from this vessel 21 to the pressure vessel 20, the internal pressure of the vessel 20 being kept at a lower value than that of vessel 21.

A second power pump 40 delivers actuating medium from the open vessel 18 by way of a non-return valve 41 to the pressure vessel 19. The connection between the pressure vessels 19 and 20 is interrupted by a stop valve 42. The two vessels 19 and 20 also have the overflow or discharge valves 19a and 20a.

Another power pump 43 serves to evacuate the vessel 17 by way of the non-return valve 44. The three-phase main switch 45 of the motor is actuated by a relay 46. The relay 46 is connected to a pressure gauge 47 having a contact indicator 48 and also a first end contact, which may be a normally closed or bridging end contact 49 and a second end contact which may be a normally open end contact 50. As soon as the pressure in the container 17 has urged the indicator 48 into the end position wherein the contact 50 is in a bridging position, a relay circuit, from the direct current source 51, through the relay 46, the end contact 49, the end contact 50 and the auxiliary contact 52 of the main switch, is closed. The power pump 43 then operates until the above mentioned relay circuit is opened by the raising of the end contact 49, which occurs when the other predetermined pressure-limiting value for the vessel 17 is reached.

The piston valve 1 is arranged so that it maintains a constant opening position independently of the local operating pressure in the pipe line containing the medium to be controlled, i.e., the force operating the valve exceeds the force of the medium being controlled by the valve. For this purpose the pressure chamber supply line 32 is provided with a flow quantity indicator 53, the pointer 54 of which carries a contact 55. In the predetermined position of the valve piston 3 and, consequently, of the pointer 54, the contact 55 is only connected to the contact 57 which is electrically connected to one side of the voltage source 56. When the indicator is deflected, however, contact 55 bridges contact 57 to either the contact 58 or the contact 59 and consequently allows the relay coil 60 or 61 to be energized. Thus the two-way valve 27 which is normally in the closed or no-flow position is moved in FIG. 1 either to a left control position or right control position, so that the pressure chamber supply line 32 is in communication with one or other of the outflow pipe lines 22 or 23. According to whether the higher or lower pressure is communicated to the line 32 a shifting of the valve is effected to one side or the other.

In a similar manner, the two-way or change-over valve 28 for the pressure chamber supply conduit 33 of the valve 4 has a no-flow or locking position and two conduit communicating positions. The latter positions are obtained upon excitation of one of the relay coils 62 or 63.

By depressing a hand-operated switch 64 or 65, the corresponding circuits for the coils 62 or 63 are completed to the voltage source 66. By so depressing the hand-operated switches, preferably push buttons, the supply conduit 33 is placed in communication with one of the outlet pipes 23 or 24. In this manner the diaphragm 7 can be moved. The exact position of the diaphragm can be read by means of the pointer 67 of the flow indicator 68 in the supply line 33. In addition, the pointer 67 operates two normally closed end contacts 69 and 70 which, when the piston 6 reaches one or other end position are opened to interrupt an operating circuit for the coil 62 or coil 63, in order to prevent damage or excessive stressing thereto.

The slide valve 8 is normally arranged either to completely close the operating medium pipe line or to completely open it. The two-way valve 29 in the supply line 34 therefore has only two positions which can be adjusted to one or other end position by the relay coils 71, 72, in order to render possible communication with the outlet pipe line 24 or 25. This slide valve, however, also has a return circuit for the actuating medium. The pressure chamber 9 thus has a second outlet in the form of the portion 73 of pipe line in which a motor-driven circulating pump 74 and a heat exchanger 75 are inserted. Heat may be inserted or withdrawn by way of the heat exchanger to or from the actuating medium in the return circuit so that the slide can be internally influenced by temperature. This is necessary in winter for example, when ice formation could hinder the operation and operating capacity of the slide valve.

The valve 11 can be, in effect, continuously connected to the outflow pipe 25 of the container by way of the two-way valve 30, because the spring 76 biases the valve member of the two-way valve normally into the right-hand position. By energizing the relay coil 77, however, the outflow pipe 26 can be placed in communication with the supply pipe 35.

The supply pipe 35 comprises two portions 78 and 79 which are coupled by a diaphragm pressure exchanger 80. In the portion 78 of the pipe line an actuating medium can be provided different to the actuating medium in the portion 79. In this way, it is possible to provide, independently of the actuating medium for pressure chamber 12 used in the remaining actuating supply system, another actuating medium which corresponds to definite additional requirements: Thus it is possible to ensure for example that the actuating medium in the portion 79 and in the pressure chamber 12 is adjusted to the operating medium flowing through the valve to ensure optimum operation of the valve. The actuating medium in portion 79 may also be selected so that it has lubricating properties for the piston 13 without the entire actuating system having to be filled with such medium.

The actuating medium and the operating means may however, be identical with each other, and it can thus be ensured that in cases where the two media are intended to come into contact with one another, no disadvantageous results occur.

The two-way valve 31 of the valve 14 is controlled similarly to the two-way valve 30 by means of a spring 81 and a relay coil 82 in order that the pressure chamber supply pipe 36 may be placed in communication with the outlet pipe 25 or the outlet pipe 26. The supply pipe 36 is divided into two portions 83 and 83' which are connected by a pressure multiplier 84, the pressure multiplication ratio of which corresponds to the surface ratio of the large piston 85 to the small piston 86. In addition to the provision of pressure multiplication a different actuating medium can be used in the portion 83' to that used in portion 83.

It will be realized that in FIG. 1 many possible constructional details are omitted and others are only indicated. For example, the individual valves 1, 4, 8, 11 or 14 may have additional springs which counteract the pressure acting on the outer side of the valve piston or which act to draw the piston into the position of minimum pressure chamber volume, unless of course the pressure of the actuating means is below atmospheric or the pressure of the operating medium flowing through or past the valve is not sufficient itself to return the valve piston.

Figure 2:
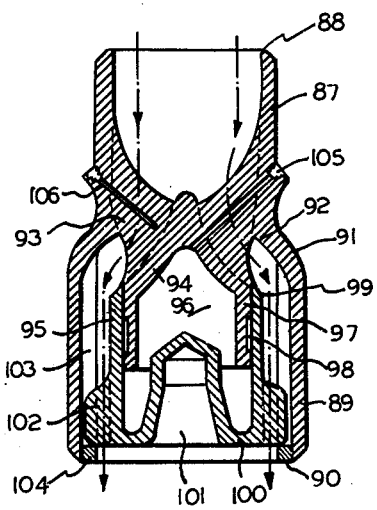
FIG. 2 shows a valve which can be employed in the framework of the invention and has a pressure chamber located in the flow stream of the medium to be controlled.

FIG. 2 shows a valve construction having a pressure chamber space within the flow stream. Such a valve has no movable parts disposed externally of i.e. extending through the valve casing, and so a number of sealing problems which would otherwise occur do not apply. A valve having a pressure chamber in the flow stream could however only be used singly hitherto because, on account of the limited possible size of the valve casing, the cross section of the pressure chamber could not be adapted at will to the majority of operating conditions likely to be encountered. Such adaptation of the individual cross sections is no longer necessary in the present invention because of the adaptation of the actuation pressure to meet the different operating conditions.

The casing of the valve shown in FIG. 2 is composed of a pipe member 87 having an end 88 and a pipe member 89 having an end 90 of larger diameter than the end 88. A transition 91 between the ends 88, 90 occurs near the valve seat 92. A supporting member 94 is held in a center position between two stream-lined webs 93, which member 94, together with the piston 95 encloses the pressure chamber 96. For better guidance of the piston and sealing of the pressure medium chamber, the supporting member has a wall 97 which extends into the piston and is provided with a peripheral groove 98. The piston 95 at its free end has a seating surface 99 corresponding to the fixed valve seat 92. In the base 100 of the piston an inwardly-pointing outwardly-open depression 101 is formed which effectively displaces the center of gravity of the piston towards its geometric center. The vanes 102 serve to guide the piston in grooves 103 which are closed at their ends by welded abutments 104. The actuating medium, that is to say, liquid or gas under pressure can be introduced into the pressure chamber 96 through a bore 105. The blind bore hole 106 serves for measuring and checking purposes, such as a temperature measurement.

Figure 3:
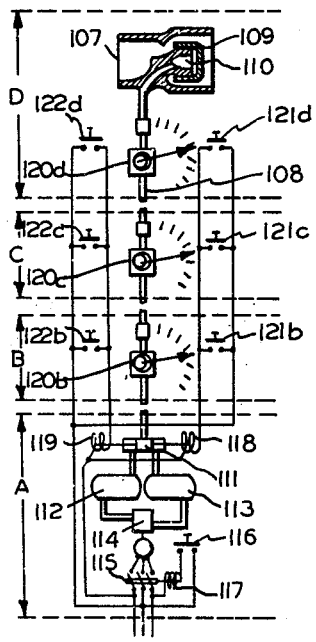
FIG. 3 is a circuit diagram to allow a valve to be actuated and controlled from several positions.

In FIG. 3 the flow of the actuating medium through a comparatively long supply line 108 to a pressure chamber 110 controlling the piston 109 is shown for a single valve 107 of the entire system. The pipe line 108 can be connected by means of the double position switching means or two way valve 111, which normally assumes the illustrated center blocking or no-flow position, to the pressure vessels 112 and 113. The two vessels are charged by means of the power pump 114. The main switch 115 can be operated by hand by means of the control push button 116 which acts to connect the relay coil 117 across two phases of the three-phase main supply. Means (not shown) ensure that the actuating medium in each of the vessels assumes the pressure predetermined therefor. The relay coils 118 and 119 for the operation of the two way valve 111 are connected to another phase pair of the three-phase main supply.

Let it be assumed that the pressure chamber supply pipe 108 is relatively long and extends from the actuating chamber A (diagrammatically shown between the two lowest dotted lines) through the main control point B, a sub-control point C to the local control point D. The respective control points are provided with flow quantity indicators 120b, 120c, 120d with pointers and scales. All the indicators must, since they are driven by the same actuating means, and since there is negligible flow thereof, indicate substantially the same value. The position of the pointers corresponds to the position of the piston 109. It is therefore possible to ascertain at each control point the condition of the appropriate valve. In addition, each of the control points B, C and D has a push button contact 121b, 121c, 121d respectively for completing a circuit through the relay coil 118, and push button contacts 122b, 122c and 122d for completing a circuit through the relay coil 119. The two-way valve 111 can therefore be operated from any control point in order to adjust the valve 107 as required, the adjusting movement being indicated by the flow indicator 120.

Figure 4:
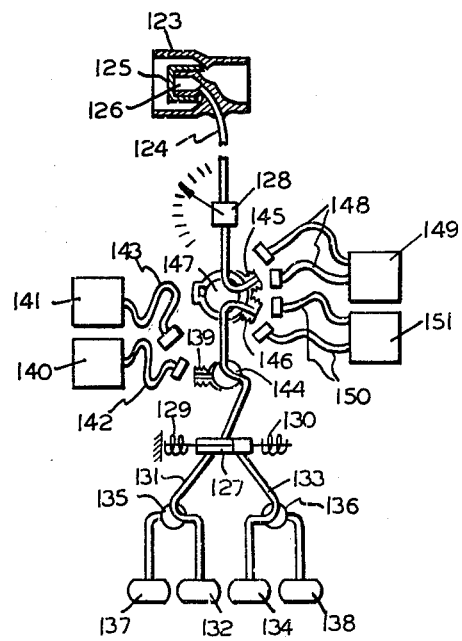
FIG. 4 is a circuit diagram for the pressure chamber supply conduit of a valve having a number of modifications and additional features; and, FIGS. 5a, 5b and 5c are interior views of a part of the cover and the cross section respectively of a flow indicator.

FIG. 4 also shows only one valve 123 with connections and accessories thereto forming part of a complete installation. The supply pipe line 124 leads to the pressure chamber 126 for actuating the valve piston 125. The flow quantity indicator 128 is positioned between a two-way means 127 and the pressure chamber. The two-way means 127 is influenced by the return spring 129 and by the relay coil 130. Fitted into the connecting pipe 131 to the vessel 132 and into the connecting pipe 133 to the vessel 134 are two way means 135 and 136 respectively by means of which it is possible, when necessary, to change over to a substitute vessel 137 and 138 respectively. Such a necessity may occur, for example, if one of the vessels 132 or 134 is not pressure-tight. This arrangement can also be used for rapidly correcting a breakdown (e.g. jamming) of the valve if the vessels 137 and 138 make available a greater actuating pressure than do the vessels 132 and 134.

In addition, the pressure chamber supply pipe 124 is provided with a first connection 139 to which, as desired, device 140 and/or device 141 for special treatment of the pressure chamber 126 can be connected by means of flexible hose 142 and 143 respectively. A connecting member 144 ensures that the connection to a flexible hose can be closed in the event of non-use. For such special treatment the device 140 for instance can add to the pressure chamber 126 a predetermined pressure by way of the actuating medium, e.g. a very high pressure in order to release the valve piston from jamming, a continuously increasing pressure in order to undertake sealing checks, a pulsating pressure and so on. The actuating medium can be changed by means of the device 141, for example, when it is necessary to introduce in the pressure chamber 126 and the associated supply pipe a special fluid to clean, lubricate, protect and remove hardened fats and so on. There is also provided a connection 145, 146 with a two position connection 147 which may be used to connect in the hydraulic circuit a flow-through device; e.g., a recorder 149 by means of the flexible pipe 148 and/or the measuring device 151 by means of the flexible pipe 150. With other flow-through devices special treatment, such as heat treatment of the actuating medium can also be effected. It is clear that the devices illustrated 140, 141, 149 and 151 can be rigidly built into the supply pipe instead of through the detachable connections shown if, for example, a special control panel or desk therefor is provided in the control room.

Figure 5C:
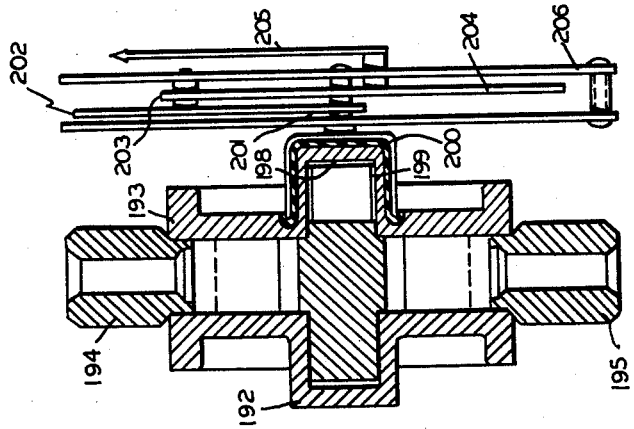
Figure 5B:
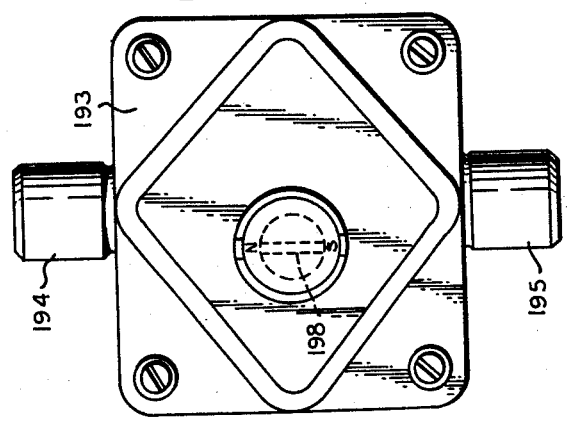
Figure 5A:
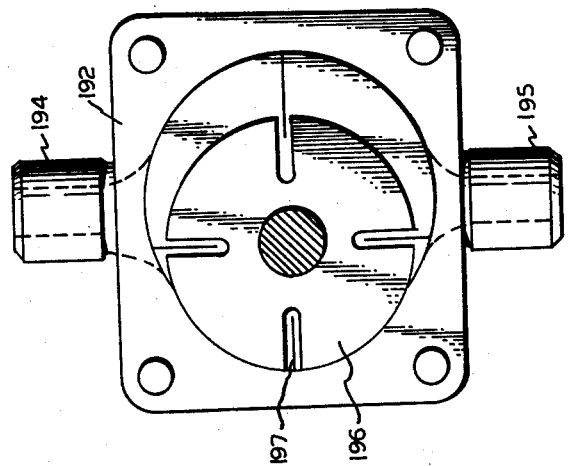

It is desirable to construct the actuating medium pipe lines in such manner that no leakage losses occur. Seals between displaceable and stationary parts are very inconvenient in this connection. If, within the framework of the invention, flow quantity indicators are to be provided in the supply pipes of the actuating medium, these must not destroy the otherwise perfectly reliable seal. For this reason the indicator shown in FIGS. 5a, 5b and 5c can be used with advantage.

A pressure cell is concerned comprising a casing 192 with cover 193 and provided with connecting sockets 194 and 195 leading to a chamber in the casing, a rotatable measuring wheel 196, having radially outwardly directed vanes 197, being disposed eccentrically in the chamber. A permanent magnet 198 which rotates with the measuring wheel extends into an attachment 199 of the cover 193.

The attachment is bounded by U-shaped stirrup 200 which acts as a short circuit and, together effects with the permanent magnet 198, a magnetic coupling. The rotational movement of the stirrup is transmitted to the pointer 205 by means of a sequence of gear wheels 201 to 204. The pointers, gear wheels and axles thereof rest in a frame 206 which also carries the scale and, if desired, the contacts.

The illustrated and described embodiments serve merely to explain the invention. Any person skilled in the art, can, without departing from the scope of the invention, make many different modifications depending on the appropriate requirements. For example, the two way valves or change over means need not be directly controlled by the measuring or indicating devices, but can be controlled by means of retardation devices in order to compensate for the time constants which exist in any relatively large supply system. The actuation system can also be controlled independently of any individual regulation as above described, by a predetermined program or automatically. The system in all these actuating, controlling and regulating operations is equivalent to an electrical actuating system, but has in addition the advantages apparent from the above description. As the embodiments show it may be in many cases advisable to combine the actuating system of the invention with electrical circuit components.

I claim:

1. In a remote control system for pressure actuated valves, a plurality of pressure actuated valves positioned within conduit means, each valve having a single actuating pressure chamber whereby a force operating the valve exceeds a force of a medium flowing in the conduit means, a plurality of external fluid pressure sources with different pressure levels, and a conduit for each valve connecting the pressure chamber of said valve to one only at any one time of at least two of the fluid pressure sources, whereby one of the fluid pressure sources affects the movement of the valve to closed position and the other fluid pressure source affects the movement of the valve to open position.

2. A system as claimed in claim 1 wherein the fluid pressure sources are operatively connected to the valves, whereby at least one pressure source serves both as a closing means for one valve and an opening means for a second valve.

3. A system as claimed in claim 1 wherein the cross sectional area of the pressure chamber of each valve is at least equal to the cross sectional area of the conduit.

4. A system as claimed in claim 1 wherein pressure transmitter means is interposed in the conduit between the valve pressure chamber and the fluid pressure sources.

5. A system as claimed in claim 1 wherein the fluid pressure sources comprise a plurality of pressure vessels, pump means for charging the vessels, and a pressure regulating device for maintaining the pressure in each vessel between predetermined limits.

6. A system as claimed in claim 1 wherein two-way valve means is positioned within the conduit between the valve pressure chamber and the fluid pressure sources, whereby the valve pressure chamber may be alternately connected to the pressure sources.

7. A system as claimed in claim 6, wherein a flow indicator is positioned within the conduit between the pressure chamber of the valves and the two-way valve means.

8. In a remote control system for a fluid conducting installation, a plurality of pressure actuated valves each provided with only one actuating pressure chamber, a common actuating center having at least three pressure sources and one actuating medium conduit for each valve leading from the pressure chamber to the actuating center, and control means for connecting said conduit to one of said pressure sources in response to an actuation order.

References Cited in the file of this patent

UNITED STATES PATENTS

| | | |
|---|---|---|
| 1,030,890 | Johnson | July 2, 1912 |
| 2,223,044 | Miller | Nov. 26, 1940 |
| 2,255,284 | Gorrie | Sept. 9, 1941 |
| 2,322,517 | Hose | June 22, 1943 |
| 2,398,775 | Beekley | Apr. 23, 1946 |
| 2,725,891 | De Bourguignon | Dec. 6, 1955 |
| 2,938,533 | Jensen | May 31, 1960 |
| 2,950,732 | Lambert | Aug. 30, 1960 |
| 3,076,471 | Salerno | Feb. 5, 1963 |